Patented Dec. 5, 1939

2,182,350

UNITED STATES PATENT OFFICE 2,182,350

SULPHUR DYESTUFFS

Robert L. Perkins, East Aurora, N. Y., assignor to National Aniline & Chemical Company, Inc., New York, N. Y., a corporation of New York No Drawing. Application November 19, 1937, Serial No. 175,438

19 Claims. (Cl. 260—139)

The present invention relates to new sulphur dyestuffs and to a process for making them.

While there are available at the present time sulphur dyestuffs which produce satisfactory shades of brown when dyed on textile materials in the usual manner from alkaline sulphide baths, many of these dyestuffs are unsatisfactory for many purposes. Thus, several of the sulphur dyes which produce satisfactory shades of brown when applied to textile materials, for example, unmordanted cotton, contain copper. Such dyes are unavailable for use where the dyed material is to be employed for the production of rubberized fabrics, since, as is well known, the presence of copper in a dyed material, which is later to be converted to a rubberized fabric, has a deleterious effect on the rubber coating, causing it to deteriorate rapidly. On the other hand, many of the sulphur dyes which are free from copper are unsatisfactory in their dyeing quality, being of low tinctorial value and producing shades, when applied to unmordanted cotton, which are dull and weak. A further property which is lacking in many sulphur dyes is the ability to be employed in standing baths.

With these deficiencies in the available brown sulphur dyestuffs in view, it is a principal object of the present invention to provide new sulphur dyestuffs free from these deficiencies and dyeing textile materials, particularly unmordanted cotton, rich brown shades of excellent fastness to light and to washing.

Another object of the invention is to provide new sulphur dyestuffs dyeing textile materials brown shades which dyestuffs are free from copper and which may be employed in standing baths.

A further object of the invention is to provide a simple and economical process for the preparation of new sulphur dyestuffs dyeing textile material from an alkaline sulphide bath brown shades.

Additional objects of the invention will in part be obvious, and will in part appear hereinafter.

In accordance with the present invention it has been discovered that a new class of sulphur dyestuffs, possessing the combined properties of producing satisfactory brown shades when dyed on textile materials from the usual alkaline sulphide baths, of being free of copper, and of being capable of being used in standing baths, may be manufactured by reacting a 1,8-aminonaphthol disulphonate with an alkali metal polysulphide in the presence of an aldehyde, particularly an aliphatic aldehyde.

In making the new sulphur dyestuffs in accordance with a preferred method of procedure, a mixture containing a neutral salt; for example, a neutral sodium salt of a 1,8-aminonaphthol disulphonic acid, at least four molar equivalents of an alkali metal polysulphide; e. g., sodium tetrasulphide, and at least one molar equivalent of an aldehyde, preferably dextrose or formaldehyde, is prepared. The mixture is then heated at an elevated temperature for a sufficient period of time to fuse the materials and to cause a reaction to take place resulting in the formation of a dry solid mass consisting of the sulphur dye.

The new sulphur dyestuffs are solids which in ground form are black to red-brown powders which are insoluble in alcohol, but are soluble in water, dilute alkali, and aqueous alkali sulphide solutions. The aqueous alkali sulphide solutions of the new dyestuffs dye unmordanted cotton yellow-brown to red-brown shades of good fastness to light and washing. The dyestuffs are of particular advantage because they can be employed in standing baths, and, in view of their freedom from copper, they may be employed for the dyeing of textile materials intended for use in the production of rubberized fabrics.

The 1,8-aminonaphthol disulphonates employed in the preparation of the new sulphur dyestuffs are used in substantially neutral condition and in view of the fact that the 1,8-aminonaphthol disulphonic acids as commercially produced are usually in the form of partially neutralized salts, it is preferable to neutralize them before they are reacted with the aldehyde and the polysulphide in the reaction mixture. This may be done conveniently by adding the necessary alkali to an aqueous suspension of the 1,8-aminonaphthol disulphonic acid to be used. Caustic soda is used preferably for this purpose in view of its low cost and satisfactory action, but caustic potash or alkali carbonates may be used with equivalent results. The aqueous solution of the resulting alkali metal salt of the 1,8-aminonaphthol disulphonic acid should be substantially neutral, but a slight excess of alkali is not objectionable.

Any of the known 1,8-aminonaphthol disulphonic acids may be employed in the preparation of the dyestuffs of the present invention, such as, for example, 1,8-aminonaphthol-3,6-disulphonic acid, 1,8-aminonaphthol-2,4-disulphonic acid, 1,8-aminonaphthol-4,6-disulphonic acid, and 1,8-aminonaphthol-3,5-disulphonic acid. It has been found in accordance with the present invention that dyestuffs prepared from salts of 1,8-aminonaphthol-3,6-disulphonic acid are of particular value, and, accordingly, such dyestuffs represent a preferred embodiment of the present invention.

As before indicated, aldehydes of varied character may be employed in admixture with the neutralized 1,8-aminonaphthol disulphonic acid and the alkali polysulphide in the preparation of the dyestuffs of the present invention. For example, aliphatic aldehydes, such as formaldehyde, paraldehyde, and the polyhydroxy aliphatic aldehydes or sugars which are exemplified by the pentoses, hexoses, etc., may be employed. It has been found, however, that of these aliphatic aldehydes, formaldehyde and the hexoses; e. g., dextrose, are of particular value when employed in the preparation of the new brown sulphur dyes. Further, other aldehydes may be employed, such as, for example, the cycloaliphatic aldehydes; e. g., cyclohexyl formaldehyde, etc., and the aromatic aldehydes of which benzaldehyde and its nitro, hydroxyl, amino, and halogen derivatives are representative.

The polysulphides employed in the preparation of the new sulphur dyestuffs should contain at least two atoms of sulphur for each atom of alkali metal therein. Furthermore, it has been found that the alkali metal polysulphides corresponding with the formula, $Me_2S_x$, wherein Me represents an alkali metal and $x$ is between 4 and 5, inclusive, when used in the process of the present invention are productive of sulphur dyestuffs having high tinctorial power and producing rich shades of brown when dyed on textile materials. When alkali polysulphides containing less than this amount of molecularly combined sulphur are employed, dyestuffs of inferior tinctorial value and dyeing quality are produced. On the other hand, if polysulphides containing more than the preferred amount are employed, there is evidenced no commensurate improvement in the final product. While polysulphides of the alkali metals, in general, may be used, it is preferred to employ sodium polysulphides in the preparation of the dyestuffs of the present invention. The polysulphides may be prepared in any convenient or desired manner, many of which are well known in the art; for example, they may be prepared in aqueous solutions from the common alkali metal sulphide, such as $Na_2S$, and the necessary amount of sulphur, or from the alkali metal hydroxide and sulphur.

In order that the invention may be more fully understood, reference should be had to the following specific examples which illustrate methods for the preparation of preferred products. It will be understood, however, the invention is not limited to these examples. The parts are by weight and the temperatures in degrees centigrade.

*Example 1.*—57.6 parts of ground sulphur are added to a solution of 78 parts fused commercial sodium sulphide (approximately 60% $Na_2S$) in 100 parts water. The mixture is stirred slowly and heated to between 95° and 100° until solution of the sulphur is complete. The resulting polysulphide solution is mixed with a slurry or solution which contains 29 parts of dextrose and a slightly alkaline solution of 50 parts of the sodium salt of H-acid (1,8-aminonaphthol-3,6-monosodium disulphonate) in 80 parts of water. The agitated mixture is heated slowly over a period of about 3 hours to a temperature of about 150° and is maintained at this temperature for two hours. The mixture is then heated over a period of about two and one-half hours to a temperature of about 270° and is maintained at this temperature for a period of from 12 to 13 hours.

The solid mass resulting from this treatment comprises the sulphur dyestuff. It is cooled and pulverized to a dark-brown powder which is readily soluble in water and in aqueous alkali sulphide solutions. An aqueous sodium sulphide vat of the dyestuff dyes unmordanted cotton a rich brown shade which is fast to washing. The dyestuff obtained in this manner has much greater tinctorial value than the dyestuff obtained from a similar preparation in which all conditions except inclusion of the dextrose are duplicated.

*Example 2.*—12.5 parts of a 37 per cent solution of formaldehyde are added to a faintly alkaline solution of 50 parts of the sodium salt of H-acid in about 80 parts water. The mixture is agitated for 20 minutes and heated in about one-half hour to about 100°. It is then mixed with an aqueous polysulphide solution containing 57.5 parts ground sulphur and 78 parts of commercial fused sodium sulphide (approximately 60% $Na_2S$) dissolved in about 100 parts water. The mixture is heated over a period of about six hours to a temperature of about 270° where it is maintained for about 13 hours. The resulting dyestuff is a solid which when cooled and ground is a dark-brown to black powder which is somewhat soluble in water, and completely soluble in aqueous sodium sulphide solution. The sulphide solution dyes cotton a brown shade which is duller than the brown obtained with the dyestuff of Example 1.

It will be understood, of course, that while the above examples are representative of preferred practice in accordance with the present invention, the procedures followed may be extensively varied without departing from the scope of the invention. For example, in place of the disodium salt 1,8-aminonaphthol-3,6-disulphonic acid of the examples, other alkali metal salts of this compound may be employed with substantially equivalent results. Further, the sodium or other alkali metal salt of 1,8-aminonaphthol-3,6-disulphonic acid may be replaced with equivalent amounts of the alkali metal salts of other 1,8-aminonaphthol disulphonic acids; for example, those mentioned above. By employing these latter materials in place of the aminonaphthol disulphonic acid salt of the examples, dyestuffs of slightly different character may be produced, but they possess the important advantages pointed out above.

Further, dyestuffs of similar properties may be prepared in an analogous manner by employing in place of the formaldehyde or dextrose of the examples equivalent amounts of mixtures of these two aldehydes, or equivalent amounts of other aliphatic or aromatic aldehydes. As before indicated, however, the preferred aldehydes for use in accordance with the present invention are aliphatic aldehydes, particularly, formaldehyde, or a hexose, such as dextrose.

In carrying out the preparation of the dyestuffs, the order and manner in which the various materials are combined may be varied. For example, while it is preferred to combine the materials in the form of their solutions or slurries and then evaporate the resulting mixture to dryness, a dyestuff may be prepared by mixing the materials without additions of water thereto and then fusing the mixture. The neutralized slurry of the 1,8-aminonaphthol disulphonate is a convenient mass to which the charge of aldehyde may be added, but it is to be understood that the aldehyde could be added with substantially equivalent results to the aqueous polysulphide solution before or after the latter is mixed with the 1,8-aminonaphthol disulphonate.

In the preparation of the new dyestuffs, the proportions of ingredients and temperatures may be varied within the scope of the present invention. It has been found, however, that to prepare sulphur dyestuffs of superior properties with respect to the shade obtained on textile materials, the amount of aldehyde used should be from one to two molar equivalents of aldehyde for each molar equivalent of the 1,8-aminonaphthol disulphonate employed. Although the use of more than this quantity of aldehyde appears to have no adverse effect on the resulting dyestuff, it causes no appreciable improvement in the yield, shade, or dyeing quality of the resulting dyestuff. and, hence, the use of an excess should be avoided. On the other hand, if materially less than the preferred amount of aldehyde is introduced into the reaction mixture, the resulting dyestuffs have been found to be of low tinctorial value, dyeing cotton dull, weak, yellow-brown shades, and, hence, the dyestuffs are materially inferior to the dyestuffs which are made with the preferred quantity of aldehyde set out above.

The alkali metal polysulphide is employed in the proportions of four molar equivalents of alkali metal polysulphide for each molar equivalent of the 1,8-aminonaphthol disulphonate in accordance with the preferred procedure, since it has been found that the use of these proportions results in a superior yield and quality of the sulphur dyestuffs. If less polysulphide is employed, the resulting dyestuffs have inferior tinctorial value and lack the red-brown tones of the dyestuffs which are made with the preferred ratio of polysulphide, and, if a larger proportion of polysulphide is employed, no commensurate improvement in the yield or quality of the dyestuff is noticed.

While it will be understood that the temperature at which the mixture of a salt of a 1,8-aminonaphthol disulphonic acid, an aldehyde, and an alkali metal polysulphide is heated cannot be exactly fixed, it has been found that the dyestuffs prepared by heating this mixture in a suitable apparatus for at least 13 hours at a temperature between about 210° C. and about 330° C. have high tinctorial strength and dye unmordanted cotton from a sulphide bath in shades which range from yellowish-brown to red-brown. If the dried mass is heated to below 210° C., the resulting dyestuff is tinctorially weak, giving dyeings of a dull shade of poor fastness, and if the dried mass is heated above 330° C., the dyestuffs tend to decompose and lose their tinctorial value and brightness.

It will thus be seen that the present invention provides new sulphur dyestuffs which may be efficiently prepared in a relatively simple manner. The dyestuffs may be employed in standing baths and are characterized by the yellowish-brown to red-brown shades they produce on unmordanted cotton. Further, because they are free of copper, they are available for use in dyeing textile materials intended for use in the production of rubberized fabrics.

Since certain changes may be made in the above processes and products without departing from the scope of the invention, it will be understood that the foregoing description should be interpreted as illustrative and not in a limiting sense.

I claim:

1. Sulphur dyestuffs dyeing unmordanted cotton brown shades and being reaction products of a 1,8-aminonaphthol disulphonate, an alkali metal polysulphide containing at least 2 atoms of sulphur for each atom of alkali metal therein, and an aldehyde.

2. Sulphur dyestuffs dyeing unmordanted cotton brown shades and being reaction products of a 1,8-aminonaphthol disulphonate, an alkali metal polysulphide containing at least 2 atoms of sulphur for each atom of alkali metal therein, and an aldehyde selected from the group consisting of aromatic aldehydes of the benzene series, cycloaliphatic aldehydes, and lower aliphatic aldehydes.

3. Sulphur dyestuffs dyeing unmordanted cotton brown shades and being reaction products of a 1,8-aminonaphthol disulphonate, an alkali metal polysulphide containing at least two atoms of sulphur for each atom of alkali metal therein, and a lower aliphatic aldehyde.

4. Sulphur dyestuffs dyeing unmordanted cotton brown shades and being reaction products of a 1,8-aminonaphthol disulphonate, an alkali metal polysulphide containing at least 2 atoms of sulphur for each atom of alkali metal therein, and a hexose.

5. Sulphur dyestuffs dyeing unmordanted cotton brown shades and being reaction products of a 1,8-aminonaphthol disulphonate, an alkali metal polysulphide containing at least 2 atoms of sulphur for each atom of alkali metal therein, and formaldehyde.

6. Sulphur dyestuffs dyeing unmordanted cotton brown shades and being reaction products of a substantially neutral alkali metal salt of a 1,8-aminonaphthol disulphonic acid, at least four molar equivalents of an alkali metal polysulphide containing at least two atoms of sulphur for each atom of alkali metal therein, and at least one molar equivalent of an aliphatic aldehyde.

7. Sulphur dyestuffs dyeing unmordanted cotton brown shades and being reaction products of a 1,8-aminonaphthol disulphonate, an alkali metal polysulphide containing at least two atoms of sulphur for each atom of alkali metal therein, and dextrose.

8. Sulphur dyestuffs dyeing unmordanted cotton brown shades and being reaction products of a substantially neutral alkali metal salt of a 1,8-aminonaphthol disulphonic acid, at least four molar equivalents of an alkali metal polysulphide containing at least two atoms of sulphur for each atom of alkali metal therein, and at least one molar equivalent of a hexose.

9. Sulphur dyestuffs dyeing unmordanted cotton brown shades and being reaction products of a substantially neutral alkali metal salt of a 1,8-aminonaphthol disulphonic acid, at least four molar equivalents of an alkali metal polysulphide containing at least two atoms of sulphur for each atom of alkali metal therein, and at least one molar equivalent of dextrose.

10. Sulphur dyestuffs dyeing unmordanted cotton brown shades and being reaction products of a substantially neutral alkali metal salt of a 1,8-aminonaphthol disulphonic acid, at least four molar equivalents of an alkali metal polysulphide containing at least two atoms of sulphur for each atom of alkali metal therein, and at least one molar equivalent of formaldehyde.

11. Sulphur dyestuffs dyeing unmordanted cotton brown shades obtainable by a process comprising evaporating to dryness an aqueous mixture containing a substantially neutral alkali metal salt of a 1,8-aminonaphthol disulphonic acid, at least four molar equivalents of an alkali metal polysulphide containing at least two atoms of sulphur for each atom of alkali metal therein, and at least one molar equivalent of an aldehyde, and heating the resulting dry mass at an elevated temperature for a sufficient period of time to fuse the materials and to cause a reaction to take place resulting in the formation of a sulphur dyestuff.

12. Sulphur dyestuffs dyeing unmordanted cotton brown shades obtainable by a process comprising evaporating to dryness an aqueous mixture containing a substantially neutral alkali metal salt of a 1,8-aminonaphthol disulphonic acid with at least four molar equivalents of an alkali metal polysulphide containing at least two atoms of sulphur for each atom of alkali metal therein and at least one molar equivalent of an aldehyde selected from the group consisting of aromatic aldehydes of the benzene series, cycloaliphatic aldehydes, and lower aliphatic aldehydes, and heating the resulting dry mass at a temperature between about 210° C. and about 330° C. for a sufficient period of time to fuse the materials and to cause a reaction to take place resulting in the formation of a sulphur dyestuff.

13. Sulphur dyestuffs dyeing unmordanted cotton brown shades obtainable by a process comprising evaporating to dryness an aqueous mixture containing a substantially neutral alkali metal salt of 1,8-aminonaphthol-3,6-disulphonic acid, at least four molar equivalents of an alkali metal polysulphide of the general formula $Me_2S_x$, wherein Me represents an alkali metal and $x$ is from 4 to 5, and at least one molar equivalent of a lower aliphatic aldehyde, and heating the resulting dry mass at a temperature between about 210° C. and about 330° C. for at least 13 hours to fuse the materials and to cause a reaction to take place resulting in the formation of a sulphur dyestuff.

14. A sulphur dyestuff dyeing unmordanted cotton a rich brown shade which is fast to washing, said dyestuff being in ground form a dark brown powder which is soluble in water and in aqueous alkali sulphide solution, said dyestuff being obtainable by a process comprising evaporating to dryness an aqueous mixture containing a substantially neutral sodium salt of 1,8-aminonaphthol-3,6-disulphonic acid, about four molar equivalents of sodium tetrasulphide and from one to two molar equivalents of dextrose, and heating the resulting dry mass at a temperature of about 270° C. for about 13 hours to fuse the materials and cause a reaction to take place resulting in the formation of a sulphur dyestuff.

15. A sulphur dyestuff dyeing unmordanted cotton a rich brown shade which is fast to washing, said dyestuff being in ground form a dark brown powder which is soluble in water and in aqueous alkali sulphide solution, said dyestuff being obtainable by a process comprising evaporating to dryness an aqueous mixture containing a substantially neutral sodium salt of 1,8-aminonaphthol-3,6-disulphonic acid, about four molar equivalents of sodium tetrasulphide and from one to two molar equivalents of formaldehyde, and heating the resulting dry mass at a temperature of about 270° C. for about 13 hours to fuse the materials and cause a reaction to take place resulting in the formation of a sulphur dyestuff.

16. The process for the preparation of sulphur dyestuffs dyeing unmordanted cotton brown shades which comprises reacting a 1,8-aminonaphthol disulphonate with an alkali metal polysulphide containing at least 2 atoms of sulphur for each atom of alkali metal therein, in the presence of an aldehyde.

17. The process for the preparation of sulphur dyestuffs dyeing unmordanted cotton brown shades which comprises reacting a substantially neutral alkali metal salt of a 1,8-aminonaphthol disulphonic acid with at least four molar equivalents of an alkali metal polysulphide containing at least two atoms of sulphur for each atom of alkali metal therein in the presence of at least one molar equivalent of an aldehyde selected from the group consisting of aromatic aldehydes of the benzene series, cycloaliphatic aldehydes, and lower aliphatic aldehydes.

18. The process for the preparation of sulphur dyestuffs dyeing unmordanted cotton brown shades which comprises evaporating to dryness an aqueous mixture containing a substantially neutral alkali metal salt of a 1,8-aminonaphthol disulphonic acid, at least four molar equivalents of an alkali metal polysulphide containing at least two atoms of sulphur for each atom of alkali metal therein, and at least one molar equivalent of a lower aliphatic aldehyde, and heating the resulting dry mass at an elevated temperature for a sufficient period of time to fuse the materials and to cause a reaction to take place resulting in the formation of a sulphur dyestuff.

19. The process for the preparation of sulphur dyestuffs dyeing unmordanted cotton brown shades which comprises evaporating to dryness an aqueous mixture containing a substantially neutral sodium salt of 1,8-aminonaphthol-3,6-disulphonic acid, at least four molar equivalents of an alkali metal polysulphide containing at least two atoms of sulphur for each atom of alkali metal therein, and at least one molar equivalent of a lower aliphatic aldehyde, and heating the resulting dry mass at a temperature between about 210° C. and about 330° C. for at least 13 hours to fuse the materials and to cause a reaction to take place resulting in the formation of a sulphur dyestuff.

ROBERT L. PERKINS.